US007302325B2

(12) United States Patent
Kudo

(10) Patent No.: US 7,302,325 B2
(45) Date of Patent: Nov. 27, 2007

(54) VEHICLE DRIVE ASSIST SYSTEM

(75) Inventor: Shinya Kudo, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 617 days.

(21) Appl. No.: 10/825,562

(22) Filed: Apr. 15, 2004

(65) Prior Publication Data

US 2004/0210364 A1 Oct. 21, 2004

(30) Foreign Application Priority Data

Apr. 17, 2003 (JP) ............................ 2003-113139

(51) Int. Cl.
*G06F 19/00* (2006.01)

(52) U.S. Cl. ......................... 701/36; 701/301; 701/93; 701/96; 340/902; 340/903; 340/904; 340/905; 340/901; 340/475; 340/476; 340/464; 340/465; 340/937; 348/148

(58) Field of Classification Search .................. 701/36, 701/301; 340/435, 475, 465, 901, 903
See application file for complete search history.

(56) References Cited

U.S. PATENT DOCUMENTS

| | | | | |
|---|---|---|---|---|
| 5,939,976 | A * | 8/1999 | Sasaki et al. | 340/435 |
| 6,204,778 | B1 * | 3/2001 | Bergan et al. | 340/936 |
| 6,459,991 | B1 * | 10/2002 | Takiguchi et al. | 701/301 |
| 6,624,782 | B2 * | 9/2003 | Jocoy et al. | 342/70 |
| 6,748,302 | B2 * | 6/2004 | Kawazoe | 701/1 |
| 6,847,894 | B1 * | 1/2005 | Hasegawa | 701/301 |
| 6,873,911 | B2 * | 3/2005 | Nishira et al. | 701/301 |
| 6,911,642 | B2 * | 6/2005 | Sartori et al. | 250/208.2 |
| 7,038,577 | B2 * | 5/2006 | Pawlicki et al. | 340/435 |
| 7,145,441 | B2 * | 12/2006 | Knoop et al. | 340/435 |
| 7,199,767 | B2 * | 4/2007 | Spero | 345/7 |
| 2002/0016653 | A1 * | 2/2002 | Levine | 701/1 |
| 2002/0036584 | A1 * | 3/2002 | Jocoy et al. | 342/70 |
| 2003/0016143 | A1 * | 1/2003 | Ghazarian | 340/901 |
| 2003/0197867 | A1 * | 10/2003 | Kwon | 356/437 |

(Continued)

FOREIGN PATENT DOCUMENTS

EP 1 096 458 A2 5/2001

(Continued)

OTHER PUBLICATIONS

Patent Abstracts of Japan; vol. 1998, No. 02, Jan. 30, 1998 & JP 09 270097 A (Nippon Signal Co Ltd: The), Oct. 14, 1997.

(Continued)

*Primary Examiner*—Thomas Black
*Assistant Examiner*—Wae Lenny Louie
(74) *Attorney, Agent, or Firm*—Darby & Darby

(57) ABSTRACT

A vehicle drive assist system detects an intention of an own vehicle to turn right in an intersection and detects an oncoming vehicle waiting for a right turn on an oncoming lane in front of the own vehicle in the intersection. Further, the system establishes a detecting area in the vicinity of the right edge of the oncoming vehicle waiting and searches an oncoming vehicle traveling straight in the detecting area. When a new solid object is detected and the solid object is a part of the left corner of the solid object, the solid object is judged to be an oncoming vehicle traveling straight.

6 Claims, 5 Drawing Sheets

U.S. PATENT DOCUMENTS

| | | | | |
|---|---|---|---|---|
| 2004/0158390 | A1* | 8/2004 | Mukaiyama | 701/200 |
| 2004/0164851 | A1* | 8/2004 | Crawshaw | 340/435 |
| 2005/0062615 | A1* | 3/2005 | Braeuchle et al. | 340/903 |
| 2006/0119473 | A1* | 6/2006 | Gunderson et al. | 340/435 |
| 2006/0206243 | A1* | 9/2006 | Pawlicki et al. | 701/1 |

FOREIGN PATENT DOCUMENTS

| | | | |
|---|---|---|---|
| EP | 1 245 443 | A2 | 10/2002 |
| JP | 9-282592 | A1 | 10/1997 |
| JP | 2001-101592 | A1 | 4/2001 |

OTHER PUBLICATIONS

Patent Abstracts of Japan; vol. 2000, No. 22, Mar. 9, 2001 & JP 2001 148098 (OKI Electric Ind Co Ltd), May 29, 2001.

* cited by examiner

VEHICLE DRIVE ASSIST SYSTEM

BACKGROUND OF THE INVENTION

1. Field of the Invention

The present invention relates to a vehicle drive assist system and more particularly to a vehicle drive assist system capable of detecting an oncoming vehicle which is difficult to be recognized at intersections based on frontal information obtained from a stereoscopic camera and the like.

2. Discussion About Prior Arts

When a vehicle make a right turn at intersections in the "keep to the left" traffic system, in case where there are oncoming vehicles waiting for turning right on oncoming lanes, it is difficult for a driver to confirm oncoming vehicles traveling straight. Under such situations, the driver must put miscellaneous information such as oncoming vehicles, pedestrians walking across a road ahead and the like in order and therefore he or she is forced to bear lots of burdens.

In order to reduce such burdens of the driver, Japanese Patent Application Laid-open No. Toku-Kai-Hei 9-282592 discloses a technique in which a collision of a vehicle turning right with an oncoming vehicle traveling straight in intersections is prevented by detecting the oncoming vehicle with an obstacle sensor installed in intersections and warning a driver.

However, the obstacle sensor and the warning system must be installed in every intersection and a huge amount of money is needed.

Further, Japanese Patent Application Laid-open No. Toku-Kai 2001-101592 discloses a technique wherein a vehicle itself has an ability to detect oncoming vehicles at an early stage using a fish-eye lens installed in a bumper of the vehicle.

However, this technique has such problems that stains, raindrops and the like sticking to the lens hinder accurate imaging and also images taken through the fish-eye lens require complicated correction processing.

SUMMARY OF THE INVENTION

It is an object of the present invention to provide a vehicle drive assist system requiring no special infrastructure capable of accurately detecting an oncoming vehicle traveling straight in intersections with a simple structure.

In order to attain the object, a vehicle drive assist system according to the present invention includes frontal circumstances recognizing means for recognizing a solid object in front of an own vehicle based on images taken by imaging means, oncoming lane crossing intension detecting means for detecting an intension of the own vehicle to cross an oncoming lane, oncoming waiting vehicle detecting means for detecting an oncoming vehicle waiting in front of the own vehicle on the oncoming lane, oncoming straight vehicle detecting area establishing means for establishing a detecting area on in the vicinity of the oncoming vehicle waiting and oncoming straight vehicle detecting means for detecting an oncoming vehicle traveling straight in the detecting area.

DETAILED DESCRIPTION OF THE PREFERRED EMBODIMENT

Figure 1:
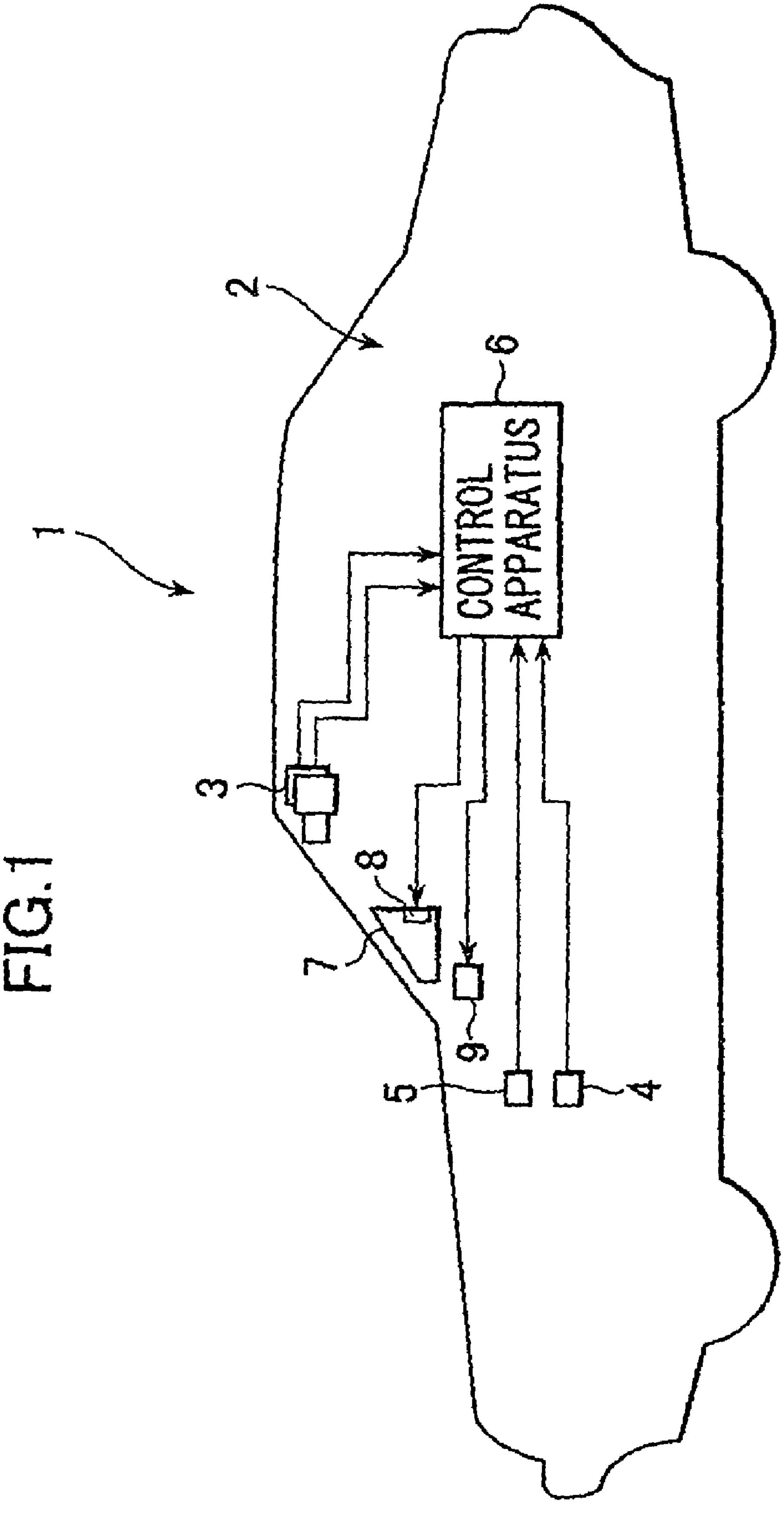
FIG. 1 is a schematic view showing a vehicle incorporating a vehicle drive assist system according to the present invention.

Referring now to FIG. 1, reference numeral 1 denotes an own vehicle on which a vehicle drive assist system 2 for detecting a presence of a vehicle coming on straight at crossroads and for warning a driver, is mounted.

The vehicle drive assist system 2 has a pair (left and right) of CCD cameras 3 using a solid-state image component such as Charge Coupled Device and the left and right cameras 3 are transversely mounted on a front ceiling of a passenger compartment at a specified interval of distance, respectively. The respective cameras take stereoscopic images of an outside object from different view points.

Further, the vehicle 1 has a vehicle speed sensor 4 for detecting a vehicle speed V, a turn signal lever 5 operated by a driver when the vehicle 1 makes a turn and the like. These detected signals indicative of the vehicle speed V, indicative of left or right turns and frontal images taken by the pair of CCD cameras 3 of the own vehicle 1 are inputted to a control apparatus 6.

Further, the control apparatus 6 inputs the own vehicle speed V, the operating signal of the turn signal switch 5 and the frontal images of the own vehicle 1 and warns the driver by operating a warning lamp 8 and a warning buzzer 9 provided in a combination meter 7 in case where an oncoming vehicle traveling straight exists when the own vehicle 1 is going to make a right turn.

The control apparatus 6 is constituted by a multi-micro processor having an image processor. The processing of images sent from the CCD cameras 3 is performed as follows. First, with respect to a pair of stereoscopic images taken by the stereoscopic CCD camera 3, distance information over the entire image is obtained from the deviation amount between corresponding positions according to the principle of trianguration and distance images representing three-dimensional distance distribution are formed based on that distance information. Then, lane marker data, side wall data such as guardrails, curbs and side walls arranged along the road and solid object data such as vehicles and the like, are extracted through the well known grouping process by comparing the distance images with the three-dimensional road profile data, side wall data, solid object data and the like stored beforehand.

Thus extracted lane marker data, side wall data and solid object data are denoted by individually different numbers, respectively. Further, the solid object data are classified into a stationary object in standstill, a forward moving objects moving in the same direction as the own vehicle 1, an oncoming vehicle coming against the own vehicle 1 and the like from the relationship between the relative displacement of the distance from the own vehicle 1 and the vehicle speed of the own vehicle 1.

Further, the control apparatus 6 detects a situation where the own vehicle 1 is in a transfer process from driving straight to turning right off the own lane and detects a presence of an oncoming waiting vehicle on the oncoming lane ahead of the own vehicle 1. The oncoming waiting vehicle is classified into two kinds, an oncoming vehicle waiting for right turn and an oncoming vehicle traveling straight but waiting for right turn of the own vehicle. Further, the control apparatus 6 establishes an oncoming straight vehicle detection area wherein an oncoming vehicle traveling straight is detected. In case where a solid object exists in an image, this detection area is established in the vicinity of the right edge of the object. In case where another object is detected in a detection area established in the next frame of the image, it is judged whether or not there is difference between distant information of the oncoming vehicle waiting right turn and distance information of the new object. In case where there is no different distance information, it is judged that the left side (when viewed from the solid object) or the right side (when viewed from the own vehicle 1) part of the new solid object is detected and the new solid object is an oncoming vehicle traveling straight. This judgment can eliminate possibility that a vehicle coming from the right (when viewed from the own vehicle 1) is erroneously recognized to be an oncoming vehicle traveling straight. Further, in case where the oncoming vehicle traveling straight is detected, the control apparatus 6 operates the warning lamp 8 and the warning buzzer 9 according to a position where the oncoming vehicle traveling straight exists. Further, the control apparatus 6 acts as frontal circumstance recognizing means, oncoming lane crossing intension detecting means, oncoming waiting vehicle detecting means, oncoming straight vehicle detecting area establishing means and oncoming straight vehicle detecting means and warning means.

Figure 2:
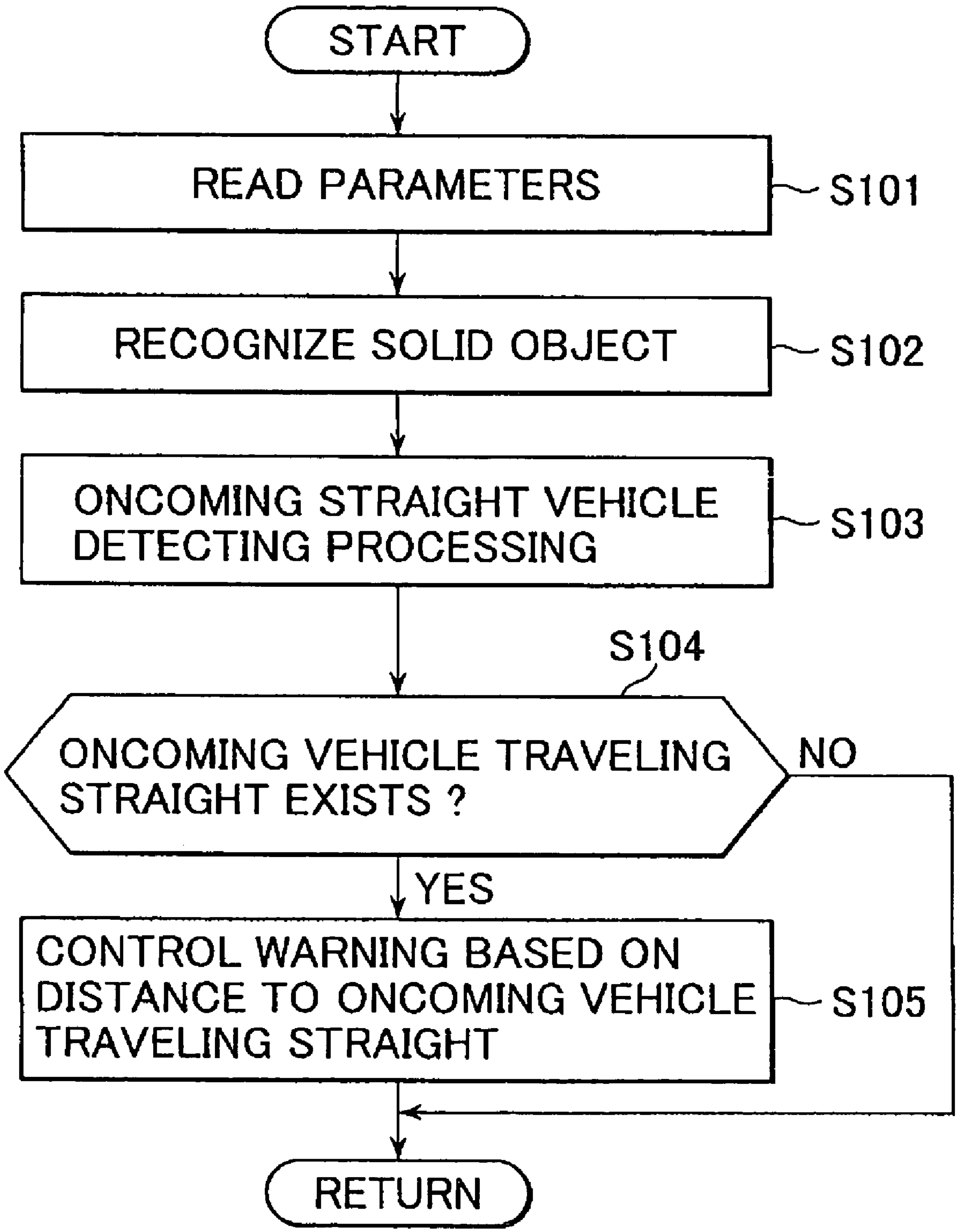
FIG. 2 is a flowchart of a routine for a vehicle drive assist control.

The drive assist control program of the control apparatus 6 will be described by referring to a flowchart of FIG. 2. This routine is executed every specified time. First, at a step (hereinafter referred to as "S") 101, images, the own vehicle speed V and the operating signal input to the control apparatus 6 from the CCD camera 3, the vehicle speed sensor 4 and the turn signal switch 5, respectively.

Then, the program goes to S102 where solid objects are extracted and recognized based on the images from the CCD camera 3.

Then, the program goes to S103 where an oncoming vehicle traveling straight which will be described hereinafter in detail is detected by an oncoming vehicle traveling straight detecting routine and goes to S104. At S104, it is judged whether or not the oncoming vehicle traveling straight is detected at S103.

In case where no oncoming vehicle traveling straight is detected, the program leaves the routine and in case where an oncoming vehicle traveling straight is detected, the program goes to S105.

When an oncoming vehicle traveling straight is detected and the program goes to S105, the control apparatus 6 outputs an operating signal to the warning lamp 8 and the warning buzzer 9 according to the distance between the oncoming vehicle traveling straight and the own vehicle 1 and the program leaves the routine. The operating signal has a higher frequency as the distance between the oncoming vehicle and the own vehicle becomes short and has a lower frequency as the distance becomes far. Further, the acoustic level of the warning buzzer 9 may be varied according to the distance between the oncoming vehicle and the own vehicle.

Figure 3:
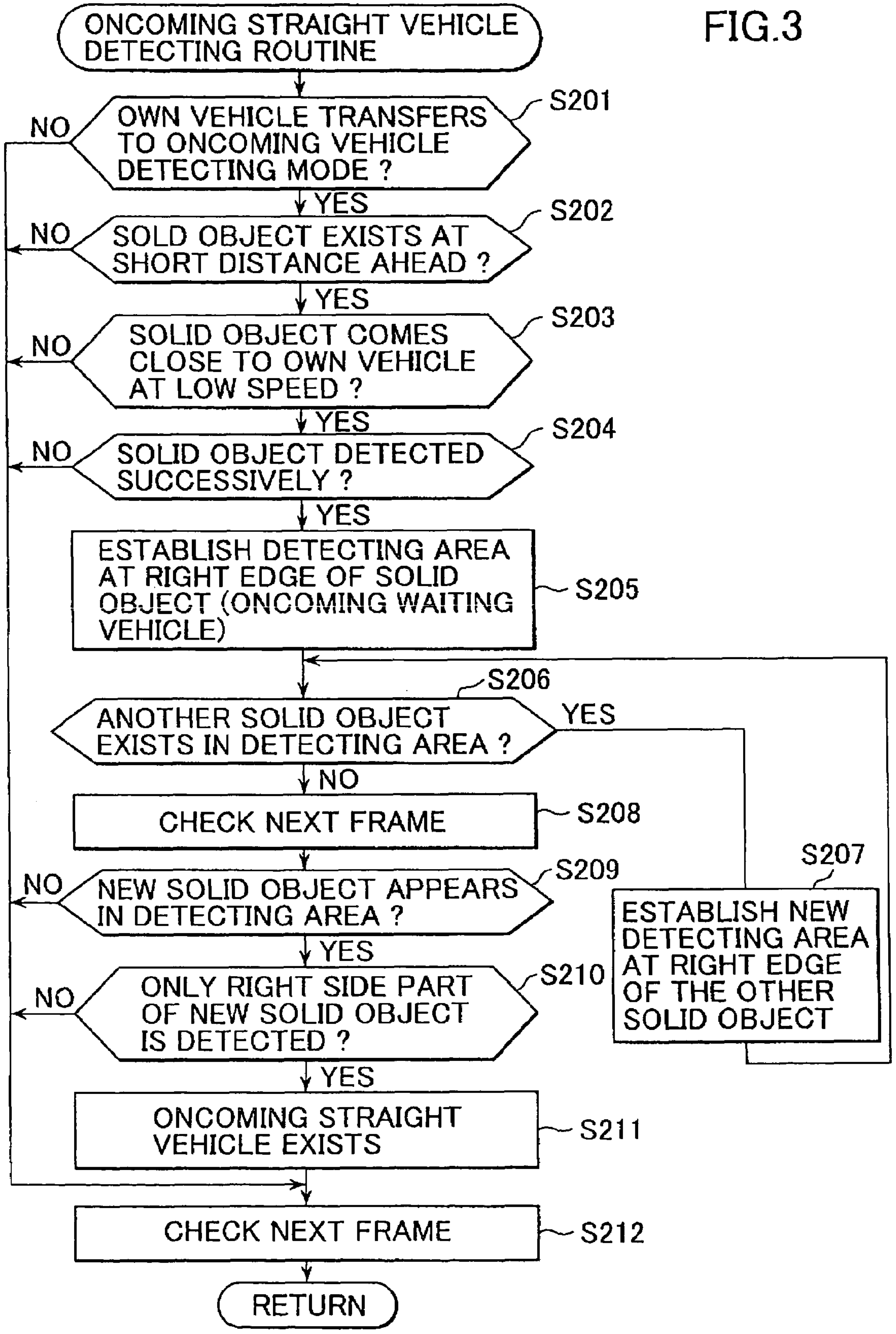
FIG. 3 is a flowchart of an oncoming straight vehicle detection routine.

The oncoming vehicle traveling straight detecting routine will be described by referring to a flowchart shown in FIG. 3.

First, at S201, it is judged whether or not the own vehicle 1 transfers to an oncoming vehicle detecting mode. If the own vehicle 1 does not transfer to the oncoming vehicle detecting mode, the program skips to S212 where the next frame is checked, leaving the routine. The oncoming vehicle detecting mode is a condition that the vehicle speed of the own vehicle 1 is low (for example, below 15 kilometers/hour) and also the turn signal switch 5 is turned on for turning right.

If it is judged that the own vehicle transfers to the oncoming vehicle detecting mode, the program goes to S202 where it is judged whether or not a solid object exists in front of the own vehicle 1 at a short distance (for example, 4 meters to 12 meters). As a result of the judgment, if no solid object exists, the program skips to S212 where the next frame is checked, leaving the routine. Further, if a solid object exists, the program goes to S203 where it is judged whether or not the solid object is coming close to the own vehicle 1 at a low speed (for example, below 15 kilometers/hour).

As a result of the judgment at S203, if the solid object is not coming close to the own vehicle 1 at a low speed, the program skips to S212 where the next frame is checked, leaving the routine. Further, if the solid object is coming close to the own vehicle 1 at a low speed, the program goes to S204 where it is investigated whether or not the solid object has been detected successively in a couple of past frames (for example, 3 frames).

Figure 4:
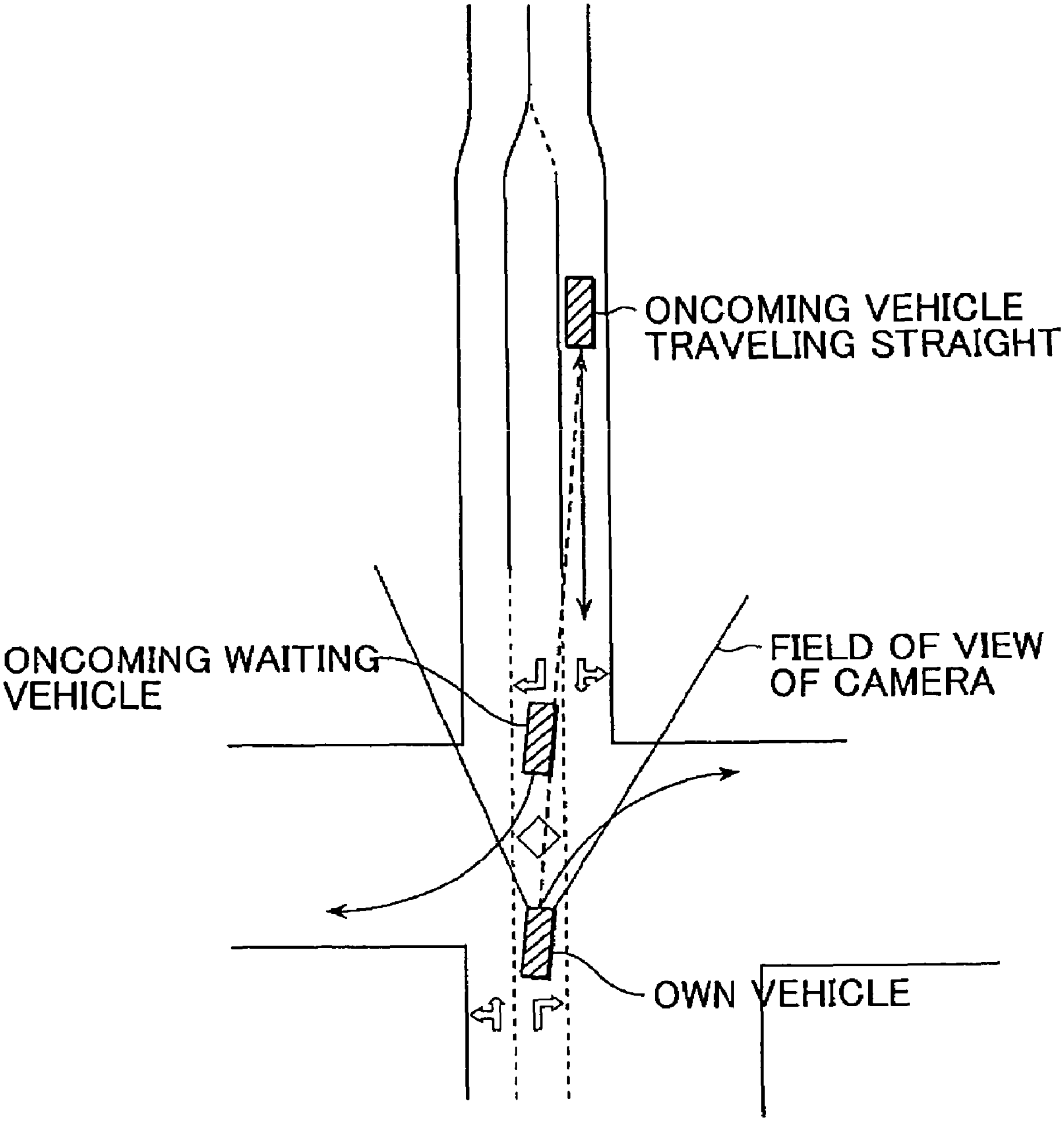
FIG. 4 is an explanatory diagram showing a situation of a vehicle making a right turn in an intersection.
Figure 5:
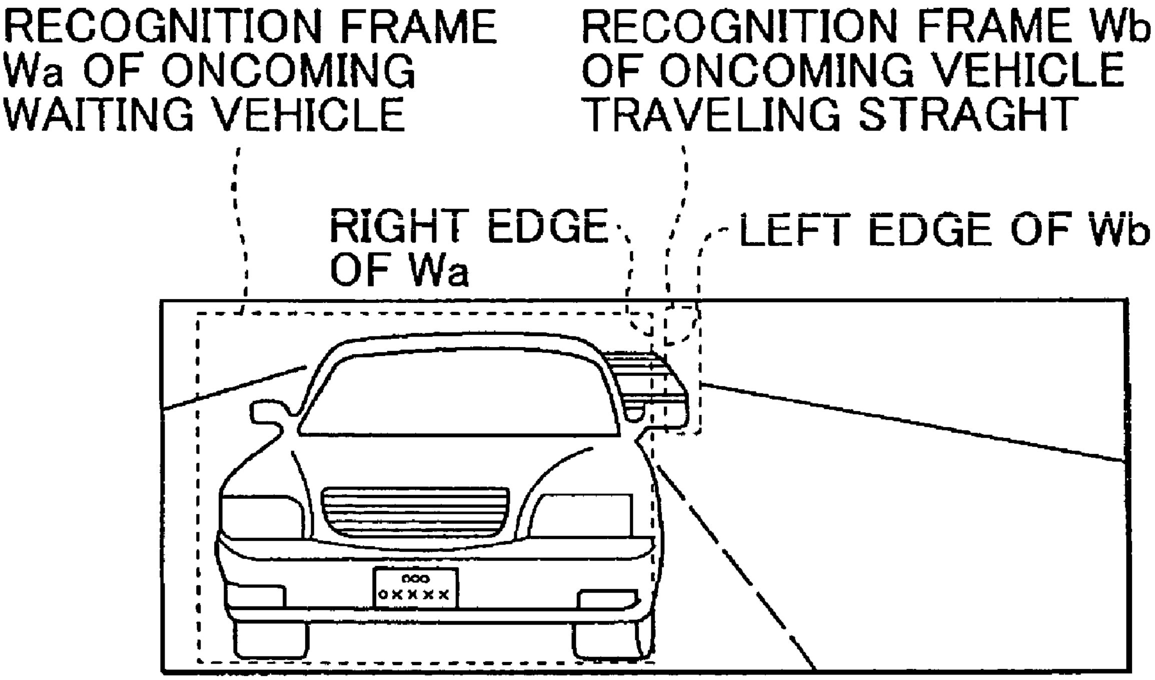
FIG. 5 is an explanatory diagram showing a frontal image viewed from an own vehicle.

That is, in this condition, as shown in FIG. 4, there is possibility that the solid object is an oncoming vehicle waiting right turn or an oncoming vehicle traveling straight but waiting for the own vehicle turning right. Hereinafter, these vehicles are referred to as an oncoming waiting vehicle. Such images as shown in FIG. 5 are taken from the own vehicle 1. That is, it is judged whether or not such images appear on successive three past frames.

As a result of this judgment, in case where such images do not appear on successive three past frames, the solid object is judged to already pass or is judged to be a detection error and the program skips to S212, leaving the routine.

On the other hand, in case where the solid object is detected successively in a couple of past frames, the program goes to S205 in which it is judged that the solid object is an oncoming waiting vehicle. At this moment, a recognition frame Wa is formed around the oncoming waiting vehicle on the image and an oncoming vehicle traveling straight detecting area is established in the vicinity of the right (when viewed from the own vehicle 1) edge of the recognition frame Wa.

After that, the program goes to S206 where it is judged whether or not another object always exists in that established detecting area. As a result of this judgment, in case where the other object always exists, this solid object is deemed to be another oncoming vehicle waiting right turn behind a forefront oncoming vehicle waiting right turn, an oncoming vehicle traveling straight but waiting own vehicle turning right or a lateral side surface of the forefront oncoming vehicle waiting right turn. Then, at S207, anew oncoming vehicle traveling straight detecting area (new detecting area) is established in the vicinity of the right (when viewed from the own vehicle 1) edge of the other object and the same process as S206 is repeated.

As a result of the judgment at S206, in case where no solid object always exists in that detecting area, the program goes to S208 where the next frame is checked. At S209, it is judged whether or not a new solid object appears in the detecting area of the next frame.

As a result of the judgment at S209, in case where a new solid object appears in the detecting area of the next frame, a recognition frame Wb of the new solid object is established as shown in FIG. 5. The program goes to S210 where it is judged whether or not only a right side (when viewed from the own vehicle 1) part of the new solid object is detected by judging whether or not distance information different from distance information to the new solid object and to the oncoming waiting vehicle, respectively exists between the new solid object and the oncoming waiting vehicle.

As a result of the judgment at S210, in case where there is a part having different distance values, the program skips to S212 where the next frame is checked, leaving the routine. Further, in case where there is no part having different distance values, it is judged at S211 that the right side part of the new solid object has appeared and this solid object is an oncoming vehicle traveling straight and the judgment is outputted to the warning lamp 8 and the warning buzzer 9. Then, the program goes to S212 where the next frame is checked, leaving the routine.

On the other hand, as a result of the judgment at S209, in case where no new solid object is found at the detecting area of the next frame, the program skips to S212 where the second next frame is checked, leaving the routine.

According to the embodiment of the present invention, an oncoming vehicle traveling straight at an intersection can be detected easily and simply only by attaching the oncoming vehicle traveling straight detecting program to the image process using a pair of CCD cameras 3 mounted on the own vehicle 1 and executing the program.

Further, since the pair of CCD cameras 3 is disposed in the passenger compartment, there is no troubles caused by stains or raindrops. Further, the oncoming vehicle traveling straight can be detected at an early stage without calculating the vehicle speed or the traveling direction of the oncoming vehicle traveling straight.

In the embodiment, the vehicle drive assist control system has been described under the keep to the left traffic system, however, it is needless to say that the drive assist control system can be applied to the "keep to the right" traffic system.

The entire contents of Japanese Patent Application No. Tokugan 2003-113139 filed Apr. 17, 2003, is incorporated herein by reference.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments which can be embodied without departing from the principle of the invention set out in the appended claims.

What is claimed is:

1. A vehicle drive assist system, comprising:

frontal circumstances recognizing means for recognizing a solid object in front of an own vehicle based on images taken by imaging means;

oncoming lane crossing intension detecting means for detecting an intension of said own vehicle to cross an oncoming lane;

oncoming waiting vehicle detecting means for detecting an oncoming vehicle waiting in front of said own vehicle on said oncoming lane;

oncoming straight vehicle detecting area establishing means for establishing a detecting area in the vicinity of said oncoming vehicle waiting; and oncoming straight vehicle detecting means for detecting an oncoming vehicle traveling straight in said detecting area.

2. The vehicle drive assist system according to claim 1, wherein said oncoming lane crossing intension detecting means detect an intension of said own vehicle to cross said oncoming lane when said own vehicle travels at a low speed and when a turn signal switch is turned on.

3. The vehicle drive assist system according to claim 1, wherein said oncoming waiting vehicle detecting means recognize an oncoming vehicle as an oncoming vehicle waiting when said oncoming vehicle exists within a predetermined distance in front of said own vehicle and when said oncoming vehicle travels at a low speed toward said own vehicle and when said oncoming vehicle is detected successively on several frames of said images.

4. The vehicle drive assist system according to claim 1, wherein said oncoming straight vehicle detecting means recognize an oncoming vehicle as an oncoming vehicle traveling straight when a new solid object appears in said detecting area and when only a portion on an oncoming lane side of said new solid object is detected.

5. The vehicle drive assist system according to claim 1, wherein when another solid object always exists in said detecting area, a new detecting area is established on the oncoming lane side of said other solid object and said detecting area is substituted with said new detecting area.

6. The vehicle drive assist system according to claim 1, further comprising: warning means for warning a driver of said own vehicle when said oncoming vehicle traveling straight is detected.

* * * * *